United States Patent [19]

Karpal

[11] Patent Number: 5,221,016

[45] Date of Patent: Jun. 22, 1993

[54] INSULATING CONTAINER AND METHOD OF MAKING SAME

[76] Inventor: David Karpal, 461-204 Wellesley Dr., Corona, Calif. 91219

[21] Appl. No.: 447,803

[22] Filed: Dec. 8, 1989

Related U.S. Application Data

[63] Continuation of Ser. No. 248,739, Sep. 23, 1988, abandoned.

[51] Int. Cl.$^5$ .................... B65D 23/08; B65D 23/10; B65D 25/48
[52] U.S. Cl. .................... 215/12.2; 215/13.1; 215/229; 215/100 A; 220/90.2; 220/90.4; 220/375; 220/902; 220/903; 220/709; 222/183; 222/211; 224/148
[58] Field of Search .................... 215/12.1, 12.2, 13.1, 215/262, 229, DIG. 6, 1 C; 220/85 SP, 90.2, 903, 375, 85 H, 902; 224/148; 222/183, 211, 95, 107

[56] References Cited

U.S. PATENT DOCUMENTS

| | | | |
|---|---|---|---|
| 1,477,936 | 12/1923 | Bott | 220/85 SP |
| 2,052,307 | 8/1936 | Kennedy | 215/229 X |
| 2,464,069 | 3/1949 | Benson | 215/12.1 X |
| 2,685,319 | 8/1954 | Swasko | 215/13.1 X |
| 3,069,041 | 12/1962 | Musso et al. | 220/902 X |
| 3,814,288 | 6/1974 | Westrich | 222/183 X |
| 4,090,650 | 5/1978 | Gotta | 224/148 |
| 4,165,814 | 8/1979 | Seel | 215/229 |
| 4,196,817 | 4/1980 | Moser | 215/12.1 |
| 4,197,890 | 4/1980 | Simko | 215/12.1 X |
| 4,344,303 | 8/1982 | Kelly, Jr. | 215/12.1 X |
| 4,345,704 | 8/1982 | Boughton | 224/148 X |
| 4,383,422 | 5/1983 | Gordon et al. | 220/903 X |
| 4,549,410 | 10/1985 | Russell | 215/13.1 X |
| 4,577,474 | 3/1986 | Peterson | 220/903 X |
| 4,629,098 | 12/1986 | Eger | 220/903 X |
| 4,671,406 | 6/1987 | Baer | 215/12.1 X |
| 4,754,902 | 7/1988 | Opfergelt | 224/148 X |
| 4,802,602 | 2/1989 | Evans et al. | 220/85 H |
| 4,813,558 | 3/1989 | Fujiyoshi | 1220/85 H X |
| 4,852,781 | 8/1989 | Shurnik et al. | 224/148 |

FOREIGN PATENT DOCUMENTS

| | | | |
|---|---|---|---|
| 255225 | 3/1964 | Australia | 215/13.1 |
| 280423 | 8/1913 | Fed. Rep. of Germany | 215/12.1 |
| 431808 | 11/1911 | France | 215/12.1 |
| 134220 | 1/1921 | United Kingdom | 214/13.1 |

Primary Examiner—Sue A. Weaver
Attorney, Agent, or Firm—Bernard L. Kleinke; William Patrick Waters; Jerry R. Potts

[57] ABSTRACT

A new insulated container, includes a hollow bottle being composed of pliable resilient material, and an insulation sleeve disposed over a portion of the outer surface of the bottle and being contracted frictionally thereabout. The sleeve has a mouth portion for receiving the bottle. The sleeve is composed of a pliable resilient material and includes an outer insulation sleeve portion and an inner pliable sleeve portion having a smooth inner surface to facilitate the insertion of the bottle into the sleeve. The method includes forming the two-part sleeve, and then inserting the bottle into the sleeve by first moving them together telescopically until a portion of the bottle disposed within the sleeve. Thereafter, the axially directed bottle-contracting impacts are applied abruptly to the bottle and the sleeve at opposite ends thereof to cause them to move axially relative to one another until the bottle is free to expand outwardly within the sleeve for gripping the bottle frictionally.

14 Claims, 3 Drawing Sheets

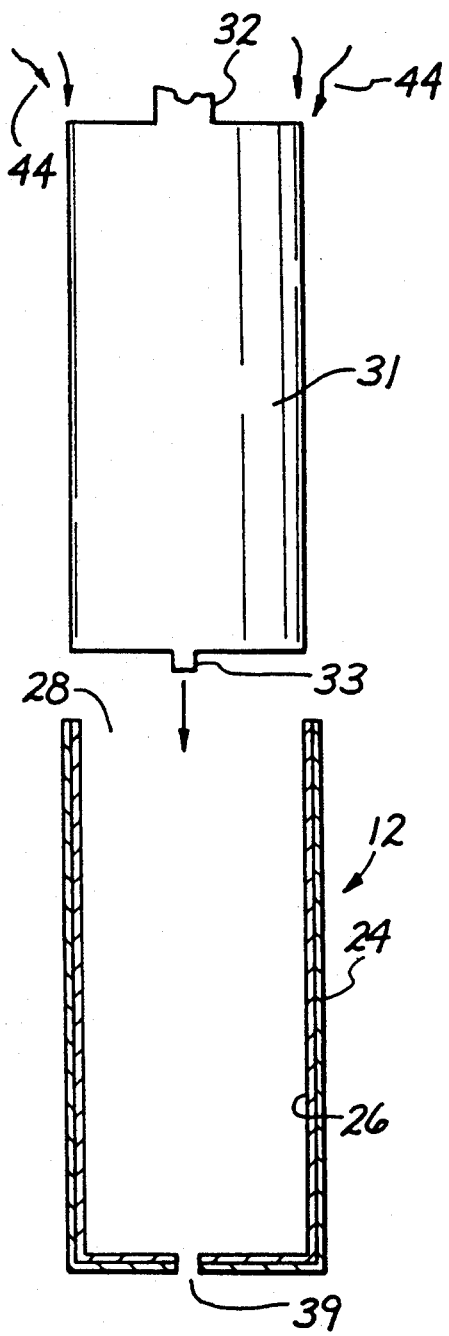
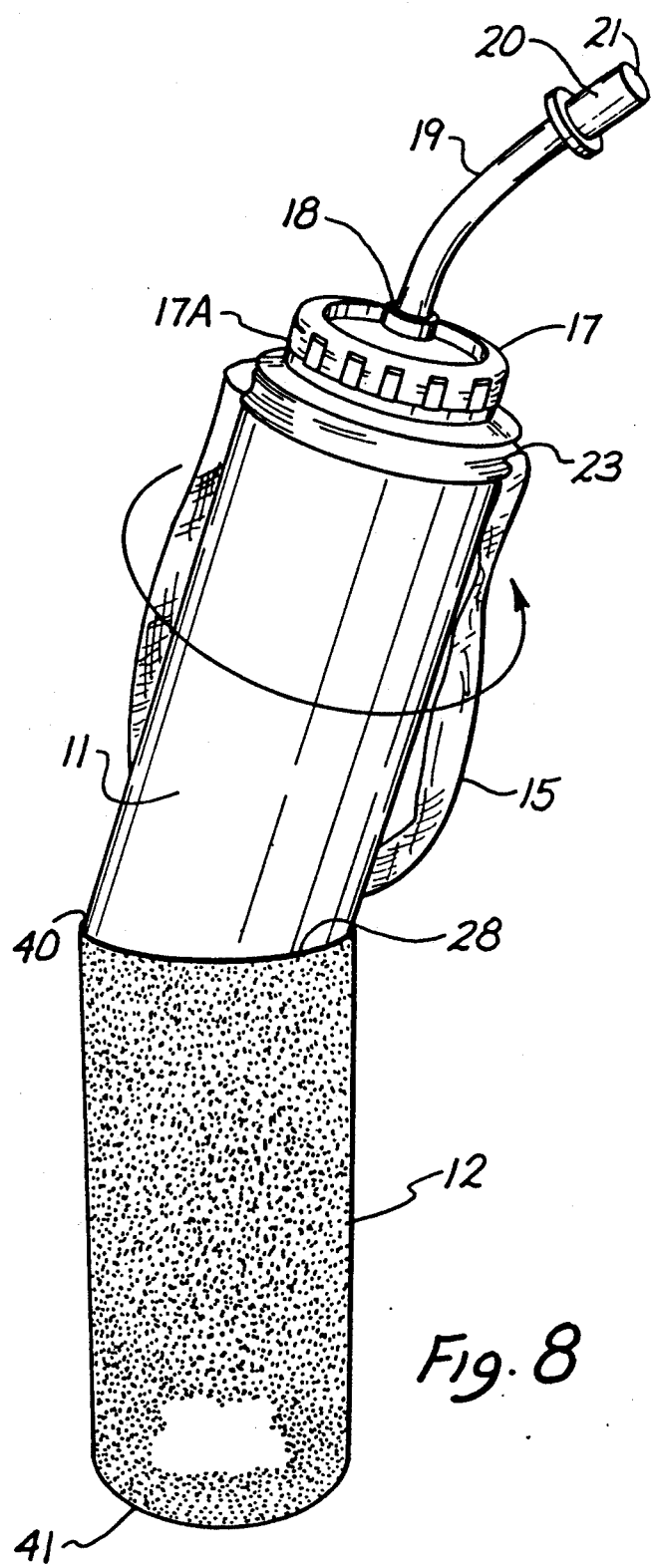
Fig. 7
Fig. 8

INSULATING CONTAINER AND METHOD OF MAKING SAME

This is a continuation of application Ser. No. 07/248,739, filed on Sep. 23, 1988, now abandoned.

DESCRIPTION

1. Technical Field

The present invention relates in general to an insulated container, and a method of making it. More particularly, the present invention relates to a sport-type container, which is insulated to maintain the contents of the container at a desired temperature, while allowing the contents to be dispensed therefrom in a convenient manner by squirting it directly into the mouth of the user.

2. Background Art

There have been many different types and kinds of sport containers used by various different athletes. These containers are generally composed of a pliable and resilient plastic material which can be squeezed by the hand of the user to force the liquid contents therein out of a nozzle and directly into the mouth of the user.

While such a container has been satisfactory for many applications, it would be highly desirable to have such a squeezable sport container, which is insulated to maintain a pre-determined temperature of the contents thereof. However, conventional insulated containers cannot lend themselves to a squeezable type container. For example, conventional vacuum bottles employ insulation materials, such as glass, which is not only rigid, it is too fragile for use as a sports container. Additionally, such a vacuum bottle is too expensive to manufacture for a low cost application.

Additionally, such a new insulated sports container should be readily transportable, so that it can be used during bicycling, as well as for use by teams of athletes. While bicycling, it would be highly desirable to have a low cost container, which can maintain the temperature of the liquid contents for relatively long periods of time.

DISCLOSURE OF THE INVENTION

Therefore, the principal object of the present invention is to provide a new and improved insulated container, and a method of making it, such that the container is squeezable for ejecting the contents therefrom.

Such a new and improved container should be relatively inexpensive to manufacture, and should be manufacturable according to efficient mass production techniques.

Briefly, the above and further objects of the present invention are realized by providing a new and improved insulated container and a method of making it, such that the container is squeezable and is relatively inexpensive to manufacture.

A new insulated container, includes a hollow bottle being composed of pliable resilient material, and an insulation sleeve disposed over a portion of the outer surface of the bottle and being contracted frictionally thereabout. The sleeve has a mouth portion for receiving the bottle. The sleeve is composed of a pliable resilient material and includes an outer insulation sleeve portion and an inner pliable sleeve portion having a smooth inner surface to facilitate the insertion of the bottle into the sleeve. The method includes forming the two-part sleeve, and then inserting the bottle into the sleeve by first moving them together telescopically until a portion of the bottle is disposed within the sleeve. Thereafter, axially directed bottle-contracting impacts are applied abruptly to the bottle and the sleeve at opposite ends thereof to cause them to move axially relative to one another until the bottle is free to expand outwardly within the sleeve for gripping the bottle frictionally.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein:

FIG. 7 is a schematic view of the next step of ejecting the resulting container sleeve from the mandrel; and FIG. 8 is a schematic view of a subsequent step of nesting the container sleeve and an inner bottle.

BEST MODE FOR CARRYING OUT THE INVENTION

Figure 1:
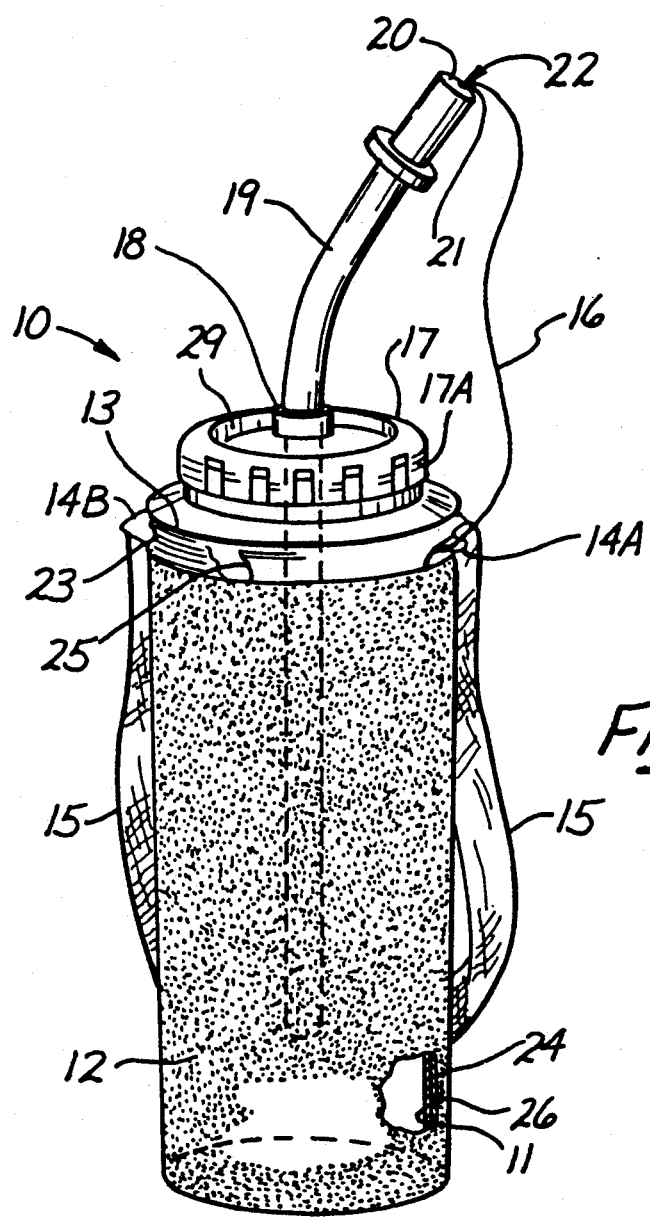
FIG. 1 is a pictorial view of an insulated container, which is constructed according to the present invention.

Referring now to the drawings, and more particularly to FIG. 1, there is shown an insulated container 10, which is constructed in accordance with the present invention.

The insulated container 10 generally comprises a hollow bottle 11 being composed of a pliable resilient material, such as polyvinylchloride and for permitting a user to squeeze it manually so that the contents of the bottle can be easily and conveniently dispensed.

An insulating sleeve 12 composed of a pliable resilient material is disposed over a portion of the outer surface of the bottle 11 and frictionally grips its surface. Disposed over the top portion of the insulating sleeve 12 is a collar 13 having a pair of loops 14A and 14B projecting therefrom. The loop 14A is adapted to receive a carrying strap 15 and a tether line on strap 16. The top portion of the bottle terminates in a threaded neck adapted to receive a cap 17.

The cap 17 has a centrally disposed hole 18 for receiving a tube 19, which extends downwardly into the inner portion of the bottle 11. Thus liquid may be discharged from the interior of the bottle via the tube 19.

The opposite end of the tube 19 is adapted with a cap 20 that includes a protuberance 21 for receiving a retaining clip 22. The retaining clip 22 is affixed to the tether line 16 that is attached at its opposite end to the loop 14, thereby permitting the cap 20 to be removed from the tube 19 and dropped so that it can be easily recovered and used to close the opening to the tube 19.

An air vent hole is provided in the cap 17 to facilitate the discharge of the container contents when the container is squeezed.

Figure 2:
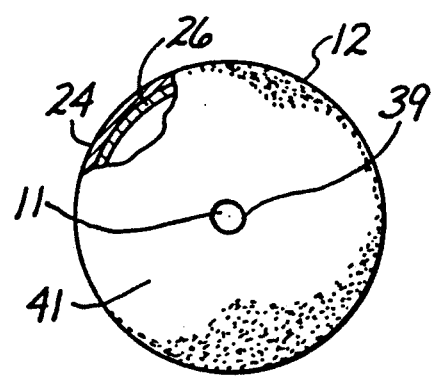
FIG. 2 is a reduced scale bottom view of the container of FIG. 1.

Considering now the insulating sleeve 12 in greater detail with reference to FIGS. 1 and 2, the insulating sleeve 12 includes an outer insulation sleeve portion 24 and an inner pliable sleeve portion 26. The inner sleeve portion 26 has a smooth inner surface that facilitates the insertion of the bottle 11 into the sleeve 12.

The outer insulation sleeve portion 24 is composed of cured liquid polyvinylchloride mixed with a foaming agent, thereby giving the outer insulation portion a soft, thick pliable structure.

The inner pliable sleeve portion 26 is composed of cured liquid/solid polyvinylchloride, thereby giving the inner pliable sleeve portion a semi-rigid structure.

The insulating sleeve 12 also includes a mouth 28 at one end that is slightly smaller in size relative to the bottle 11 in its understressed condition.

Considering now the collar 13 in greater detail with reference to FIG. 1, the collar 13 is composed of a hard plastic material such as polyvinylchloride. The collar 13 includes an outer depending continuous, preferably annular skirt 23. The skirt 23 is adapted to be secured to the upper portion of the bottle 11 by any conventional securing means such as two sided tape or plastic cement. The skirt 23 terminates in a lip 25 which matingly fits against the upper portion of the insulation sleeve 12.

The collar 13 also includes a pair of loops 14A and 14B that are adapted to receive a strap 15. In this manner, the bottle may be carried about by its strap 15. The loop 14A is divided into two sections, one section is adapted to receive the strap 15. The smaller section is adapted to receive a tether line 16 that is affixed at its opposite end to the cap.

Considering now the cap 17 in greater detail with reference to FIG. 1, the cap 17 includes an outer depending continuous, preferably annular skirt 17A. The annular skirt 17A has an outer surface and an inner surface. The inner surface is provided with a continuous helical thread which is engageable with the threads (not shown) provided upon the exterior surface of the neck of the bottle 11 to which the cap 17 is to be secured.

The cap 17 also includes a small vent hole 29 that permits the interior of the bottle to be in continuous atmospheric communication with the atmospheric air. In this manner, when liquid is extracted through the tube 19, the vacuum created thereby is immediately dissipated as the atmosphere on the interior of the bottle is in continuous communication with the atmospheric air through the vent hole 29.

The method of making the insulated container 10, is illustrated in FIGS. 3 through 8.

Figure 3:
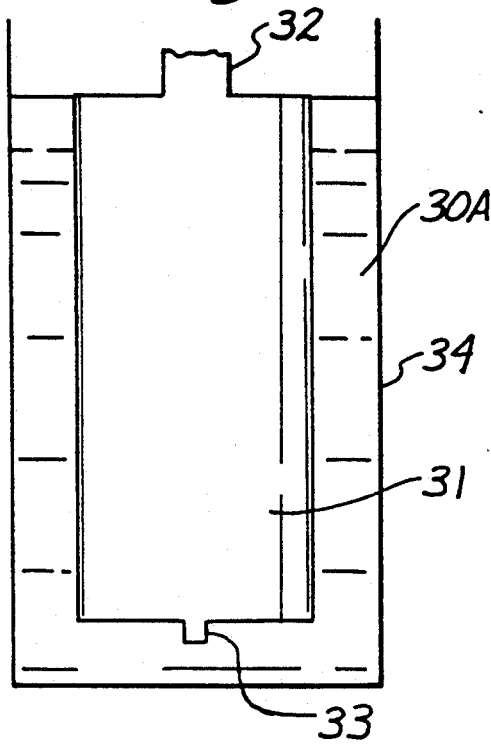
FIG. 3 is a schematic view of an initial step of making the container of FIG. 1 by emersing a mandrel into a bath of liquid/solid polyvinylchloride material.

Considering now the initial step of making the insulated container 11 with reference to FIG. 3, the inventive method is initiated by applying a liquid/solid coating of polyvinylchloride (PVC) 30A to a hollow body anodized aluminum mandrel 31 having a cylindrical shape and two centrally disposed rods 32 and 33 projecting from opposite ends of the mandrel. The liquid/solid PVC 30A is applied to the mandrel 31 by dipping the mandrel into a bath or vat 34 of the liquid/solid PVC 30A for approximately two seconds so that the mandrel is thoroughly coated with the PVC material. The rod or stud portion of the mandrel are coated with an anti-pvc agent so that none of the liquid/solid PVC 30A adheres to such rod portion during this dipping process.

Figure 4:
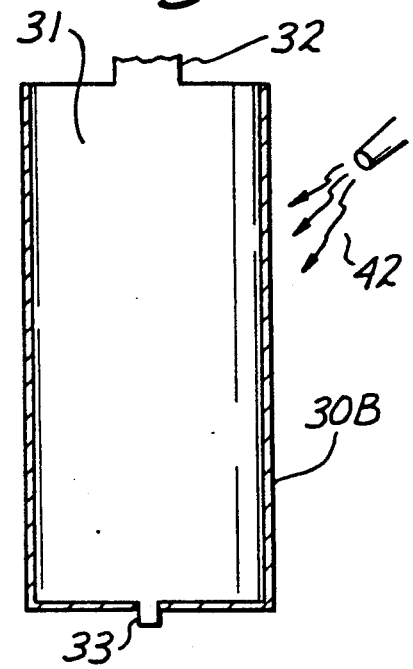
FIG. 4 is a schematic view of the next step of blow drying the coated mandrel to form an inner sleeve portion of the insulation sleeve of the container of FIG. 1.

The PVC coated mandrel is then removed from the vat 34. As best seen in FIG. 4, the PVC 30B on the mandrel is then cured for approximately ten seconds by blowing hot air 42 at approximately 300 degrees F. to 350 degrees F. directly on the PVC coated mandrel. In this manner, when the PVC material 30B cures a pliable semi-rigid sleeve or mold 26 is formed around the mandrel 31.

When the PVC coated material 30B has been cured, the PVC coated mandrel is then dipped into a second vat 35 of PVC 36A that has been mixed with an appropriate amount of foaming agent to cause the PVC 36A to foam up as it cures.

Figure 5:
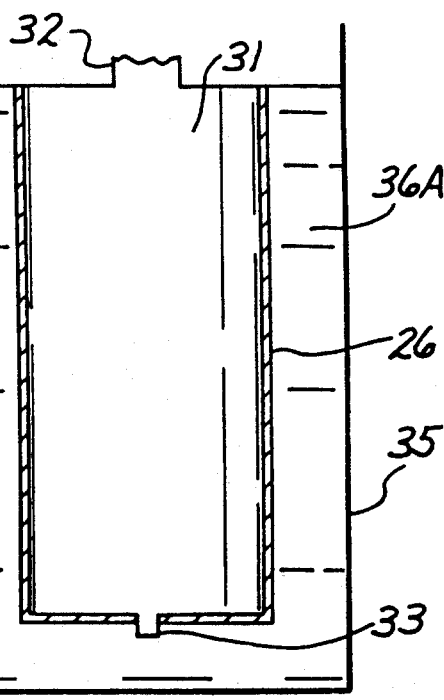
FIG. 5 is a schematic view of the next step of emersing the coated mandrel in a bath of polyvinylchloride containing a foaming agent.

Referring now to FIG. 5, the PVC coated mandrel 31 is held in the second vat 35 of PVC-foaming agent mixture 36A for approximately 30 seconds to allow a sufficient coating of the material to be adhered to the inner semi-rigid layer of PVC material 26. The coated mandrel 31 is then removed from the second vat 35.

Figure 6:
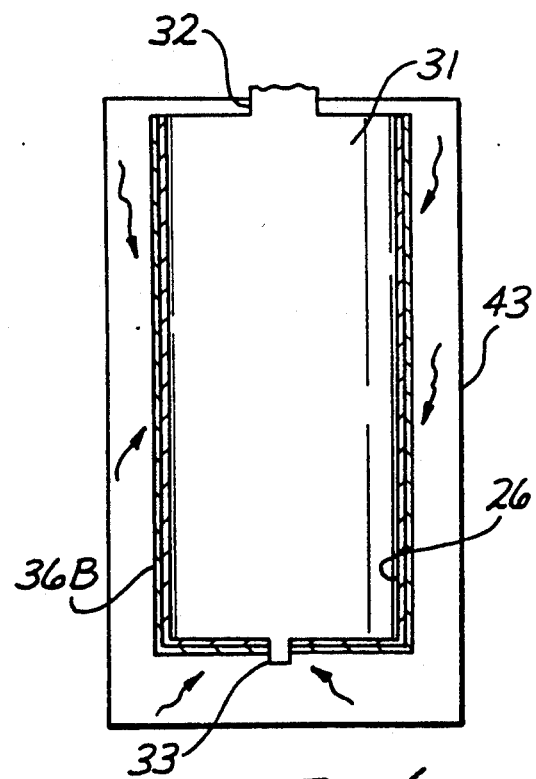
FIG. 6 is a schematic view of the next step of baking the thus-formed outer sleeve portion nested about the inner sleeve portion.

Referring now to FIG. 6, the PVC-foaming agent mixture coating 36B on the mandrel is then cured for approximately 30 minutes by baking the mateial in a conventional oven 43 type apparatus heated to a temperature ranging between 300 degrees F. and 350 degrees F. In this manner, when the PVC material 36B cures an outer insulation coating of PVC material 24 is adhered to the semi-rigid inner layer of PVC material 26 to form a hollow cup-shaped insulating sleeve 12.

The mandrel 31 with its cured PVC coating is then removed from the oven. Referring now to FIG. 7, the cured PVC coating is then removed from the mandrel by blowing a high velocity stream of air 44 at the top of coated mandrel at approximately 100 pounds per square inch. At this degree of pressure, the cured PVC mold or sleeve begins to flutter and is blown off the mandrel 31.

The PVC sleeve 12 is then allowed to air cool to room temperature.

Once the PVC sleeve 12 has cooled to room temperature, a flexible plastic bottle 11 having a diameter slightly larger than the sleeve 12 is inserted into the mouth 28 of the sleeve 12.

It should be understood that the liquid/solid PVC coating formed an inner pliable sleeve portion 26, while the second liquid PVC-foaming agent coating formed an outer insulating sleeve portion 24.

It should also be understood that the rod 33 projecting downwardly from the mandrel results in the sleeve 12 having a smaller hole 39 at its opposite end. The sleeve 12 is formed with an opened mouth 28.

Referring now to FIG. 8, the bottle 11 having a slightly larger diameter than the sleeve 12 is inserted into the sleeve's mouth 38 by inclining the bottle 11 along its vertical axis approximately 30 degrees to allow the bottom portion 40 of the bottle 11 to be partially disposed within the mouth 28. The bottle 11 is then rotated about its longitudinal axis and pushed downwardly into the sleeve 12. As the bottle 11 is pushed downwardly, it is also brought to an upright vertical position. In this manner, by pushing, rotating and swinging the bottle to an upright position, the lower portion 40 of the bottle is partially inserted into the sleeve 12.

The bottle 11 is then completely inserted into the sleeve by abruptly impacting the bottom portion 41 of the sleeve 12 upwardly while simultaneously abruptly impacting the top of the bottle 11 downwardly into the sleeve 12, thereby causing the sleeve 12 and the bottle 11 to move axially relative to one another until the sleeve 12 completely surrounds the bottle 11.

It should be understood that the small hole 39 at the opposite end of the sleeve 12 allows the air within the sleeve 12 to escape as the bottle 11 is inserted into the sleeve 12.

Once the sleeve 12 has been completely slipped over the bottle 11, the sleeve 12 retracts and frictionally engages the bottle 11, thereby providing an excellent insulating coating.

Thus, it is seen that there is provided a new and improved method of manufacturing an insulated bottle.

While particular embodiments of the present invention have been disclosed, it is to be understood that the various different modifications are possible and contemplated within the true spirit and scope of the appended claims. There is no intention, therefore of limitations to the exact abstract or disclosure herein presented.

What is claimed is:

1. An insulated container, comprising:
    a hollow member having a sidewall, said hollow member having a large transverse cross sectional area throughout its axial length in its unstressed condition;
    an insulation sleeve for helping to inhibit the loss of thermal energy from a liquid stored in said hollow member;
    said insulation sleeve having a mouth portion, said mouth portion being slightly smaller in cross sectional area relative to said large cross sectional area of said hollow member in its unstressed condition for receiving said hollow member in a stressed condition;
    said insulation sleeve including a soft, outer sleeve portion for insulating said hollow member;
    said insulation sleeve including a semi-rigid inner sleeve portion, said inner sleeve portion having a smooth substantially straight cylindrical sidewall portion complementarily-shaped relative to the shape of said sidewall of said hollow member to facilitate the insertion of the hollow member into the insulation sleeve;
    said cylindrical sidewall of said inner sleeve portion having a transverse cross section area throughout its axial length that is slightly smaller relative to said large transverse cross sectional area of said hollow member throughout its axial length in its unstressed condition for securing frictionally and confining said hollow member in a stressed condition to cause a tight frictional interengagement between said inner sleeve portion and said member throughout their axial lengths when said member is disposed within said sleeve;
    said hollow member being composed of a material sufficiently resilient to contact radially inwardly to permit the hollow member to enter said insulation sleeve through its mouth portion; and
    said hollow member being under tension within said insulation sleeve and tending to expand radially outwardly to grip frictionally in substantially an irremovable manner said inner sleeve portion surrounding said hollow member.

2. A container according to claim 1, wherein said sleeve being composed of polyvinylchloride material.

3. A container according to claim 2, wherein said outer sleeve portion is composed of a foam polyvinyl chloride material.

4. A container according to claim 2, wherein said inner sleeve portion is composed of a polyvinyl chloride material.

5. A container according to claim 1, further comprising:
    closure means including a cap and a tube extending through an opening therein.

6. An insulated container according to claim 5, wherein said closure means further includes vacuum eliminating means to facilitate the discharge of the contents of said hollow member through said tube when said hollow member is squeezed.

7. A container according to claim 1, further including an annular collar and means for securing said annular collar to a top portion of said hollow member;
    said annular collar further being dimensioned and constructed to matingly engage a top portion of said insulation sleeve, said collar having carrying means affixed thereto.

8. A container according to claim 7, wherein said carrying means includes a strap.

9. An insulation container according to claim 7, further comprising:
    closure means for sealing said hollow member to substantially prevent the underlying contents within said hollow member from being dispensed therefrom; and
    said closure means being dimensioned and constructed to be secured removably to the top portion of said hollow member.

10. An insulated container according to claim 1, wherein said hollow member includes a bottom portion and wherein said insulation sleeve is shaped to conform substantially to the bottom portion of said hollow member.

11. An insulated container according to claim 10, wherein said insulation sleeve is disposed over substantially the entire outer surface of the bottom portion of said hollow member.

12. An insulated container according to claim 1, wherein said hollow member is a container.

13. An insulated container according to claim 12, wherein said container is a bottle.

14. An insulated container according to claim 1, wherein said hollow member is a bottle composed of a pliable resilient material for permitting a user to squeeze it manually so the contents therein can be disposed therefrom.

* * * * *